A. J. VAN BOEKEL.
Seed Planter.
No. 52,471.
Patented Feb. 6, 1866.
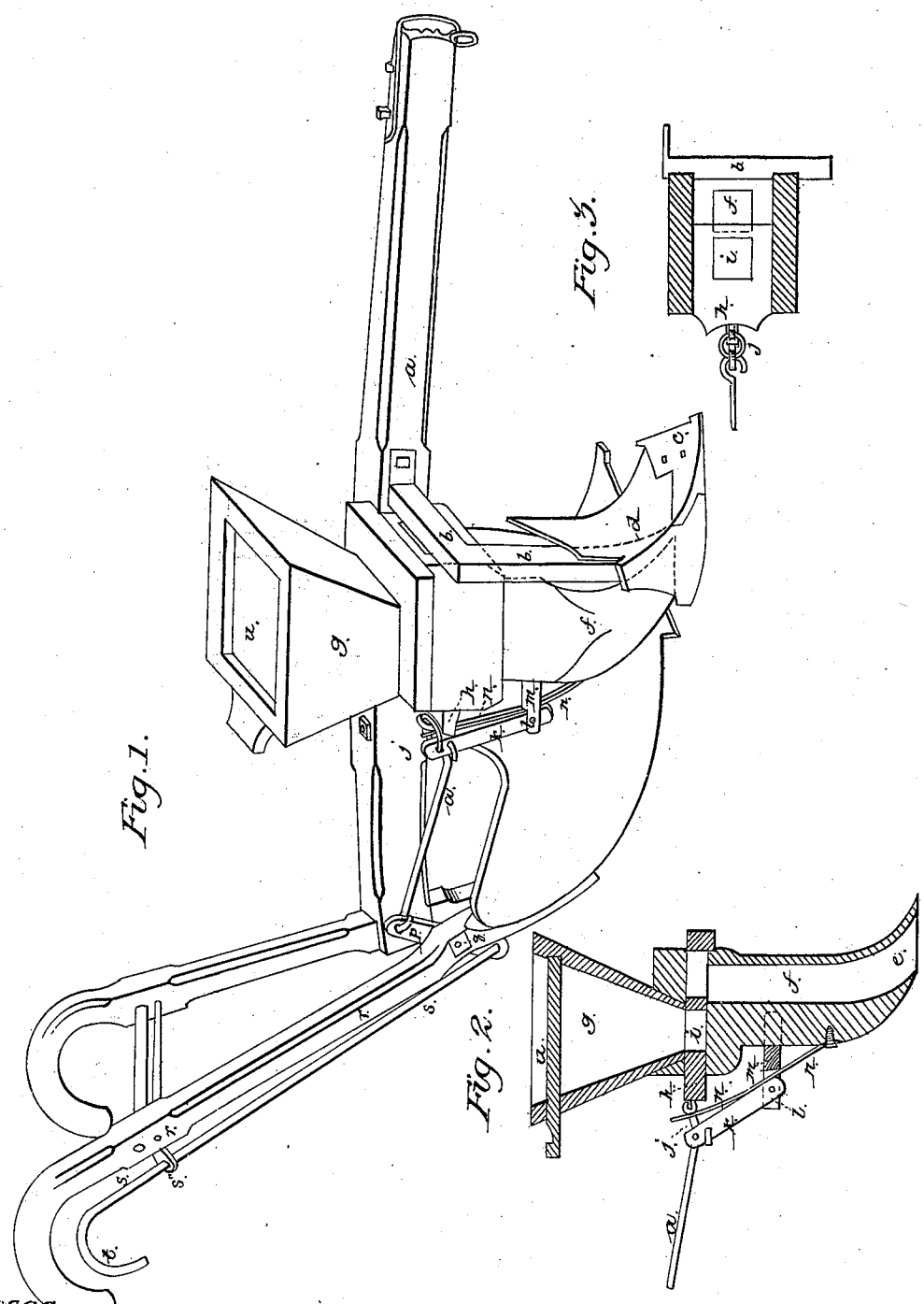

UNITED STATES PATENT OFFICE.

A. J. VAN BOEKEL, OF UNIONTOWN, NEW JERSEY.

IMPROVEMENT IN CORN-PLANTERS.

Specification forming part of Letters Patent No. 52,471, dated February 6, 1866.

*To all whom it may concern:*

Be it known that I, ANDREW J. VAN BOEKEL, of Uniontown, in the county of Middlesex and State of New Jersey, have invented certain new and useful Improvements in Machinery for Planting Corn; and I do hereby declare that the following is a full and correct description thereof, reference being had to the annexed drawings, and to the letters of reference marked thereon.

My said improvements are adapted to a plow, and may be readily removed so as to use the plow for plowing.

My invention consists chiefly in combining with a plow a corn-dropping mechanism consisting of a hopper, valve, spout, and levers to operate the valve, and an additional plowshare and mold-board, the spout of the corn-dropping mechanism being located in front of the mold-board of the plow as commonly used, and behind the additional mold-board, which is attached to the beam about the middle thereof, and the valve-lever being connected with a rod just under one of the plow-handles, so that the corn may be dropped at the will of the operator in the furrow turned by the front or added share and mold-board, and covered by the rear plowshare and mold-board, the shares and mold-boards being reversed or faced in opposite directions, so that the front or added share opens and the rear share and mold-board covers the furrow; but, more particularly to describe my said invention, I will refer to the annexed drawings by letters of reference.

Figure 1 is a perspective view of the combined plow and corn-planter; Fig. 2, longitudinal section of hopper, valve, and spout, also showing a part of the levers and rods for operating the valve; Fig. 3, horizontal section through the base of the hopper, showing a plan view of the valve.

To the beam $a$ of the plow is attached, by means of a bracket, $b$, the front or added share, $c$, and mold-board $d$. Directly behind and partly within the mold-board $d$ is the mouth $e$ of the curved spout $f$. The spout does not communicate directly with the hopper $g$, but opens into a passage in which the valve $h$ slides, which passage communicates with the hopper at the bottom thereof. The valve $h$ is a carrier as well as a valve, having a square hole, $i$, cut through it large enough to receive the required number of grains of corn to be dropped at one time, so that when the valve is moved forward under the hopper in the passage which connects the spout with the hopper, it, having the required extent of motion, carries the grains of corn from the bottom of the hopper (at the same time closing the bottom of the hopper) and delivers them to the spout, through which they drop into the furrow behind the front mold-board, and are covered by the following or rear mold-board.

The corn-dropper is attached to the plow-beam by a bolt and screw-nut on the landside of the beam. (Not shown in drawings.)

The means by which the valve is operated to drop the corn are as follows: The valve is linked, by a link, $j$, to a vibrating arm, $k$, which vibrates on a pin, $l$, in the forked end of the stud $m$, which projects from the rear of the spout. A spring, $n$, also fast at the lower end to the spout, passes up through the forked end of the stud $m$, and presses against the vibrating arm $k$ to restore the valve-carrier to its position for receiving the corn after it has been thrown forward to deliver it. A link, $o$, connects the vibrating arm $k$ with a lever, $p$, which is pivoted in a fulcrum-pin, $q$, fixed in the lower end of the plow-handle $r$, and said lever is actuated by a rod, $s$, hooked into one end of it, and which is supported and slides in an eye, $s'$, near the crook of the plow-handle $r$, the rod having a crook, $t$, at the end, so as to be conveniently moved by the fingers of the hand grasping the plow-handle whenever the operator desires to drop the corn. The hopper has a cover, $u$, to keep out dust.

I do not claim, broadly, the attachment of a corn-dropping mechanism to a common plow; but

I claim—

The attachment to and combination with a common plow of an additional plowshare and mold-board in front of the plowshare and mold-board of the plow as commonly used, and an intervening corn-dropping mechanism, the mold-boards being reversed or faced toward each other, and their line of travel being such that the wings of the mold-boards are nearly in line with each other, so that the furrow turned by the front or attached share and mold-board is immediately turned back by the plowshare and mold-board, thereby covering the corn dropped behind the furrow-opener, the whole constructed and arranged substantially as hereinbefore described.

A. J. VAN BOEKEL.

Witnesses:
F. C. TREADWELL, Jr.,
JOHN A. DUNCAN.